United States Patent
Guo et al.

(10) Patent No.: US 10,419,914 B2
(45) Date of Patent: Sep. 17, 2019

(54) METHOD, APPARATUS, AND SYSTEM FOR HANDLING AN ALARM EVENT

(71) Applicant: Huawei Technologies Co., Ltd., Shenzhen (CN)

(72) Inventors: Xiaolong Guo, Beijing (CN); Zhenxing Hu, Beijing (CN); Yue Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 975 days.

(21) Appl. No.: 14/228,928

(22) Filed: Mar. 28, 2014

(65) Prior Publication Data
US 2014/0235193 A1 Aug. 21, 2014
US 2017/0188215 A9 Jun. 29, 2017

Related U.S. Application Data (63) Continuation of application No. PCT/CN2012/082569, filed on Oct. 8, 2012.

(30) Foreign Application Priority Data

Sep. 30, 2011 (CN) .......................... 2001 1 0297538

(51) Int. Cl.
   *H04W 4/90* (2018.01)
   *H04W 76/50* (2018.01)
   (Continued)

(52) U.S. Cl.
   CPC ............. *H04W 4/90* (2018.02); *H04W 72/04* (2013.01); *H04W 76/50* (2018.02); *H04W 28/06* (2013.01); *H04W 76/27* (2018.02)

(58) Field of Classification Search
   CPC ....... H04W 4/22; H04W 76/007; H04W 4/06; H04W 4/12; H04W 4/02; H04W 68/00;
   (Continued)

(56) References Cited

U.S. PATENT DOCUMENTS 7,058,385 B2  6/2006  Lauper
7,840,355 B2  11/2010 Breed et al.
(Continued)

FOREIGN PATENT DOCUMENTS

CN    1446008 A    10/2003
CN  101112021 A    1/2008
(Continued)

OTHER PUBLICATIONS

International Search Report received in PCT/CN2012/082569, dated Jan. 17, 2013, 12 pages.
(Continued)

*Primary Examiner* — Ernest G Tacsik
(74) *Attorney, Agent, or Firm* — Slater Matsil, LLP (57) ABSTRACT

A method, an apparatus, and a system for implementing alarm event handling. The method includes: acquiring, by a first NodeB eNB, alarm event EM information reported by a user terminal UE; sending, by the first eNB, an EM notification that includes the EM information to at least one eNB that needs to be notified of the EM information, so that the at least one eNB sends the EM notification to a UE of the at least one eNB; and sending, by the first eNB, the EM notification that includes the EM information to a UE of the first eNB. By using the method, the apparatus, and the system according to the embodiments of the present invention, a signaling interaction process for alarm event handling in an emergency case is shortened, thereby greatly shortening a communications delay of a cellular network communications system and greatly reducing system load.

28 Claims, 5 Drawing Sheets

(51) Int. Cl.
*H04W 72/04* (2009.01)
*H04W 76/27* (2018.01)
*H04W 28/06* (2009.01)

(58) Field of Classification Search
CPC ... H04W 76/002; G08B 25/016; G08B 21/10; G08G 1/0104; H04L 12/1895
See application file for complete search history.

(56) References Cited

U.S. PATENT DOCUMENTS

| | | | |
|---|---|---|---|
| 2003/0141990 A1 | 7/2003 | Coon | |
| 2005/0266849 A1 | 12/2005 | Li et al. | |
| 2006/0174014 A1 | 8/2006 | Bae | |
| 2008/0194224 A1 | 8/2008 | Thorson et al. | |
| 2009/0247114 A1* | 10/2009 | Sennett | H04W 76/007 455/404.1 |
| 2010/0026472 A1* | 2/2010 | Kitazoe | G08B 27/006 340/311.2 |
| 2010/0075627 A1* | 3/2010 | Roberts | H04J 11/0093 455/404.1 |
| 2010/0115275 A1* | 5/2010 | Suh | H04L 63/205 713/168 |
| 2010/0240338 A1* | 9/2010 | Mallick | H04L 12/5691 455/404.1 |
| 2010/0267356 A1* | 10/2010 | Ohgushi | G08B 27/006 455/404.1 |
| 2010/0330951 A1* | 12/2010 | Chen | H04W 4/22 455/404.1 |
| 2011/0117876 A1* | 5/2011 | Xu | H04W 4/22 455/404.1 |
| 2011/0177824 A1* | 7/2011 | Hasegawa | H04W 4/22 455/450 |
| 2011/0237218 A1* | 9/2011 | Aoyama | H04H 20/59 455/404.1 |
| 2012/0023178 A1* | 1/2012 | Drevon | H04L 12/1895 709/206 |
| 2012/0208543 A1 | 8/2012 | Takagi | |
| 2012/0269099 A1* | 10/2012 | Chin | H04W 4/22 370/259 |
| 2013/0203372 A1* | 8/2013 | Sigle | H04W 76/007 455/404.1 |

FOREIGN PATENT DOCUMENTS

| | | |
|---|---|---|
| CN | 101635603 A | 1/2010 |
| CN | 101656915 A | 2/2010 |
| CN | 102006556 A | 4/2011 |
| CN | 102149061 A | 8/2011 |
| EP | 2445236 A1 | 4/2012 |
| WO | 2010120689 A2 | 10/2010 |
| WO | 2011039636 A2 | 4/2011 |
| WO | 2011046150 A1 | 4/2011 |

OTHER PUBLICATIONS

201110297538.X, First Chinese Office Action, dated Sep. 24, 2014, 9 pages.

* cited by examiner

METHOD, APPARATUS, AND SYSTEM FOR HANDLING AN ALARM EVENT

This application is a continuation of International Application No. PCT/CN2012/082569, filed on Oct. 8, 2012, which claims priority to Chinese Patent Application No. 201110297538.X, filed on Sep. 30, 2011, both of which are hereby incorporated by reference in their entireties.

TECHNICAL FIELD

The present invention relates to the field of communications technologies, and in particular, to a method, an apparatus, and a system for implementing alarm event handling.

BACKGROUND

Currently, with the development of communications technologies, the Internet of Things for implementing intelligent interconnection between a person, a device, and a system is considered as a third tide of the world information industry, following computers, the Internet, and mobile communications networks. Its purpose is to connect all articles to the Internet by using an information sensing device, thereby implementing intelligent identification and management.

In an intelligent transportation system, a type of applications is emergency pre-warning, including pre-warning of an accident ahead and pre-warning of road traffic ahead. Such an application requires an end-to-end delay of hundred milliseconds, so that more vehicles can avoid danger, thereby improving travel safety and reducing life or property loss.

In terms of short-distance communications technologies, an existing cellular mobile communications system has numerous advantages, such as seamless coverage and convenient deployment. However, because its end-to-end delay reaches seconds, a communications delay requirement of an emergency service cannot be met. In addition, information that is sent needs to pass many nodes and there are many signaling interactions. Therefore, when devices of the Internet of Things execute periodical reporting on a large scale, there is also a problem of system overload caused by excessive signaling interactions.

SUMMARY OF THE INVENTION

In view of this, embodiments of the present invention provide a method, an apparatus, and a system for implementing alarm event handling, so as to shorten a communications delay and reduce system load.

The embodiments of the present invention provide the following technical solutions to resolve the foregoing problem.

According to one aspect, a method for handling an alarm event is provided. A first NodeB eNB acquires alarm event EM information reported by a user equipment UE. The first eNB sends an EM notification that includes the EM information to at least one eNB that needs to be notified of the EM information, so that the at least one eNB sends the EM notification to a UE that belongs to the at least one eNB. The first eNB sends the EM notification that includes the EM information to a UE of the first eNB.

According to another aspect, a method for handling an alarm event is provided. At least one NodeB eNB receives an EM notification that includes alarm event EM information. The EM information is acquired by a first eNB from EM information reported by a user equipment UE. The at least one eNB sends the EM notification to a UE that belongs to the at least one eNB. The EM notification includes an EM event.

According to another aspect, a method for handling an alarm event is provided. A mobility management entity MME receives an EM notification that includes EM information. After receiving the EM notification that includes the EM information, the MME sends the EM notification that includes the EM information to at least one eNB.

According to another aspect, an apparatus for handling an alarm event is provided. An acquiring module is configured to acquire alarm event EM information reported by a user equipment UE. A sending module is configured to send an EM notification to at least one eNB that needs to be notified of the EM information. The EM notification includes the EM information acquired by the acquiring module. The sending module is configured to send the EM notification that includes the EM information to a UE of a first eNB.

According to another aspect, an apparatus for handling an alarm event is provided. A receiving module is configured to receive an EM notification that includes alarm event EM information. The EM information is acquired by a first eNB from EM information reported by a user equipment UE. A sending module is configured to send the EM notification to a UE that belongs to at least one eNB. The EM notification is received by the receiving module and includes an EM information.

According to another aspect, an apparatus for handling an alarm event is provided. A receiving module is configured to receive an EM notification that includes EM information. A sending module is configured to send the EM notification that includes the EM information to at least one eNB after the receiving module receives the EM notification that includes the EM information.

It can be learned that, according to the method, the apparatus, and the system in the embodiments of the present invention, by using an eNB or an MME as a forwarding point, an eNB, to which a UE to be notified of the EM information belongs, is notified of an EM information reported by a UE. Then each eNB notifies a corresponding UE of the EM information, thereby reducing nodes that are passed in the EM notification process as compared with an existing call process. Therefore, a signaling interaction process for alarm event handling in an emergency case is shortened, thereby greatly shortening a communications delay of a cellular network communications system and greatly reducing system load.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In an intelligent transportation system, a technology such as DSRC (dedicated short range communications) implements, through communication and forwarding between vehicles, emergency pre-warning notification. This method, however, requires that a short-range communications module be added to all the vehicles, communications quality cannot be ensured, and there is a strict requirement for a communications distance. In addition, when emergency communication is implemented through communication and forwarding between a vehicle and a road-side device, a large number of road-side devices need to be deployed to ensure a short delay of emergency pre-warning at various points, thereby incurring high costs.

For example, according to the prior art, in a process of paging from a user equipment UE1 to another user equipment UE2, an access process and the paging process take relatively long time, and many nodes need to be passed from the UE1 to the UE2. That is, an entire path starts from the UE1, ultimately reaches the UE2, and often needs to pass the following in turn an eNB (evolved NodeB), an S-GW (service gateway), a P-GW (packet data gateway), an MME (mobility management entity), an APP (application), a P-GW, an S-GW, and an eNB. A maximum delay of the entire path can reach approximately three seconds. Therefore, when devices of the Internet of Things execute periodical reporting on a large scale, there is also a problem of system overload caused by excessive signaling interactions.

Figure 1:
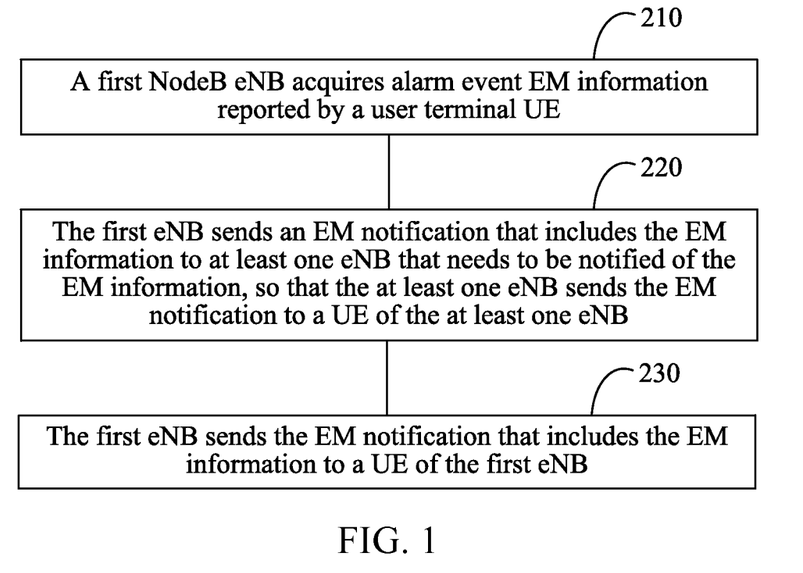
FIG. 1 is a schematic flowchart of a method for implementing alarm event handling according to an embodiment of the present invention.

To resolve the foregoing technical problem, the present invention provides a method for handling an alarm event. Details are given as follows:

An embodiment of the present invention provides a method for handling an alarm event. The method may be applied to a system, such as UTMS (Universal Mobile Telecommunications System) or LTE (Long Term Evolution communications system). In this embodiment of the present invention, only an LTE system is used as an example for description. Specifically, as shown in FIG. 1, the method includes the following steps.

Step 210: A first eNB (NodeB) acquires EM (emergency message, alarm event) information reported by a UE.

In an actual application process, when a UE on which an EM information occurs is in connected state, the UE directly sends the EM information to a first eNB to which the UE belongs; and specifically, the UE may send the EM information to the first eNB to which the UE belongs in a manner of sending NAS (non-access stratum) signaling, a service request (service request) message, or an attach request (attach request) message. The NAS signaling, the service request message, or the attach request carries the EM information. Certainly, the UE may directly send an EM message to the first eNB, notifying the first eNB of related information about the EM event, and this is not specifically limited in this embodiment.

When the UE on which the EM information occurs is in idle state, the UE needs to establish an RRC (radio resource control) connection with the first eNB to which the UE belongs before the EM information is reported. An existing UE access manner may be used in a process of establishing the RRC connection. For example, the process may include the following steps S211: After detecting the EM information, the UE sends an RRC Connection Request (radio resource control connection request) message to the first eNB to which the UE belongs.

S212: After receiving the RRC Connection Request message, the first eNB feeds back an RRC Connection Setup (radio resource control connection setup) message to the UE.

S213: After receiving the RRC Connection Setup message, the UE feeds back an RRC Connection Setup Complete (radio resource control connection setup complete) message to the first eNB, where the RRC Connection Setup Complete message carries the NAS (non-access stratum) signaling that includes the EM information, the service request (service request) message that includes the EM information, or the attach request (attach) message that includes the EM information; the RRC Connection Setup Complete message may also directly carry the EM information.

It should be noted that on a basis of the foregoing step, to enable the EM information information to be more accurately transferred, the method in this embodiment may further include: presetting a dedicated preamble (preamble) used for the EM information for the first eNB, and notifying UEs in a cell of the first eNB by using cell broadcast, so that a UE capable of EM information reporting stores the dedicated preamble of the EM information, and so that when detecting occurrence of the EM information, the UE reports the EM information information by using the dedicated preamble, and thereby the first eNB acquires, by using the dedicated preamble, the EM information reported by the UE.

The EM information may further include but is not limited to: an EM information indication message, EM information point information, vehicle location information, traffic direction information, and the like.

Step 220: The first eNB sends an EM notification that includes the EM information to at least one eNB that needs to be notified of the EM information, so that the at least one eNB sends the EM notification to a UE of the at least one eNB.

In this embodiment, the first eNB may serve as a relay to forward the notification, or an MME may serve as a relay to forward the notification, specifically depending on an actual application, and this is not specifically limited in this specification. The following provides a detailed description by using the two forwarding forms.

A. The first eNB serves as a relay to forward the notification.

After receiving the EM information, the first eNB first determines whether to notify the at least one eNB of the EM information, and if yes, sends an EM notification message to the at least one eNB; after receiving the EM notification, the at least one eNB determines whether to notify another eNB of the EM information, and if yes, sends the EM notification message to the another eNB.

It should be noted that when the first eNB determines whether to notify the at least one eNB of the EM information, either of the following two manners may be used but this is not limited herein:

(1) The first eNB performs determining based on location information of a UE that needs to be notified of the EM information. Specifically, the location information of the UE is longitude and latitude information of the UE, and the first eNB determines, based on the longitude and latitude information of the UE and network planning and deployment of the eNB, whether the EM notification needs to be forwarded to an eNB to which the UE belongs.

(2) A neighboring cell forwarding table of the first eNB is pre-configured, where the forwarding table records information about the at least one eNB that needs to be notified of the EM information; and after receiving the EM information, if the first eNB detects the at least one eNB in the neighboring cell forwarding table, the first eNB may use the forwarding table to send the EM notification to the at least one eNB.

B. An MME serves as a relay to forward the notification.

After receiving the EM information, the first eNB notifies the MME of the EM information. A specific notification manner may be: adding the EM event information to the NAS signaling, or directly sending the EM information to the MME. Certainly, a person of ordinary skill in the art may easily understand that there may be another manner, and this is not limited in this embodiment. After receiving the EM information, the MME sends an EM notification that includes the EM information to the at least one eNB that needs to be notified of the EM information, and a specific notification manner may be any one of the following manners but is not limited to this:

(1) Learn, according to the EM information, the at least one eNB that needs to be notified of the EM information.

(2) Acquire location information of a UE that needs to be notified of the EM information, and deliver, by using the location information, a notification to an eNB to which the UE belongs. Specifically, the location information of the UE is longitude and latitude information of the UE; and after the longitude and latitude information of the UE and entire network planning and deployment of the eNB are acquired, it may be determined whether the EM notification needs to be delivered to the eNB to which the UE belongs, and specifically this may be performed with reference to an existing manner of determining an eNB by using location information of a UE, and no further details are provided herein in this specification.

(3) Pre-configure an EM information forwarding table, where the forwarding table records information about the at least one eNB that needs to be notified of the EM information, and then forward an EM notification message to the at least one eNB by using the forwarding table.

It should be noted that after the MME acquires the EM information, if the UE has executed authentication of EM information reporting capability, the MME directly sends the EM notification message to the at least one eNB that needs to be notified of the EM information; or if the UE does not execute the authentication operation, the UE needs to execute the authentication operation, and a specific authentication process is similar to an existing manner and no further details are provided herein in this specification. In addition, in this embodiment, the authentication operation may also be completed on the first eNB to which the UE belongs, where the UE is a UE on which the EM occurs, and a specific authentication process is also the same as an existing manner, and no further details are provided herein in this specification.

Step 230: The first eNB sends the EM notification that includes the EM information to a UE of the first eNB.

Specifically, the sending, by the first eNB, the EM notification that includes the EM information to a UE of the first eNB may be implemented in any one of the following manners but is not limited to this.

A. After the first eNB receives the EM information, if the information is long EM information, the first eNB generates and sends an EM broadcast message that includes the long EM information, where the long EM information includes the location information of the UE and/or moving direction information of the UE and/or specific content information of the EM information; and the first eNB sends a paging message that carries an indication of the EM broadcast message to the UE of the first eNB, where specifically the location information of the UE is the longitude and latitude information of the UE; the moving direction information of the UE includes a displacement direction, a displacement angle, and the like of the UE, such as moving direction information indicating that the UE is moving in a direction of 30 degrees northwest; and the specific content of the EM information includes but is not limited to car collision, vehicle malfunction, landslide, and the like.

B. After the first eNB receives the EM information, if the EM information is short EM information that includes indication information of the EM information, the first eNB directly sends a paging message that carries an EM information indication to the UE of the first eNB, where the indication information of the EM information is EM indication or the like and generally occupies only one bit, and certainly is not limited to this.

C. After the first eNB receives the EM information, the first eNB uses a paging message to carry EM scheduling information, and transmits the EM information to the UE by using a PDSCH (physical downlink shared channel) and a PDCCH (physical downlink control channel).

D. After the first eNB receives the EM information, the first eNB sends, by scheduling an RNTI (radio network temporary identifier) dedicated for the EM or using a dedicated RNTI PDCCH to carry the EM information, the EM notification that includes the EM information to the UE of the first eNB.

It should be noted that the foregoing four manners of delivering the EM notification are described merely by using the first eNB as an example in this embodiment, and another delivery manner in which the at least one eNB delivers the EM notification to the UE is the same, and no further details are provided herein in this specification.

It can be learned that, according to the method in this embodiments, by using an eNB or an MME as a forwarding point, an eNB to which a UE to be notified of the EM information belongs is notified of an EM information reported by a UE; and then each eNB notifies the EM information to a corresponding UE. Therefore, a signaling interaction process for alarm event handling in an emergency case is shortened, thereby greatly shortening a communications delay of a cellular network communications system and greatly reducing system load.

The following describes in detail the method of the first embodiment by using an example that an MME serves as a forwarding point and an example that an eNB serves as a forwarding point.

Figure 2:
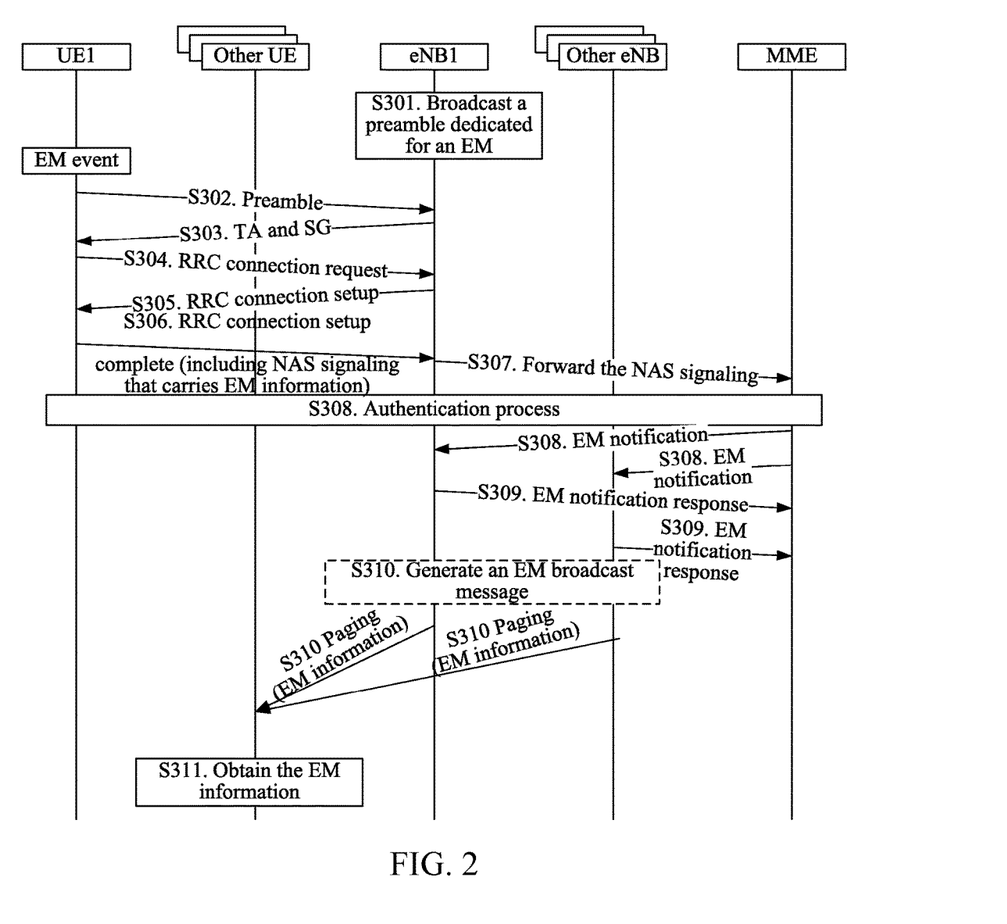
FIG. 2 is a schematic flowchart of another method for implementing alarm event handling according to an embodiment of the present invention, where an MME is used as a forwarding point.

A second embodiment of the present invention is described by using an example that an MME serves as a forwarding point. As shown in FIG. 2, the method includes the following steps.

S301: A dedicated preamble of an EM information is configured for an eNB1, and the eNB1 notifies UEs in a cell of the dedicated preamble by using cell broadcast, so that a UE capable of EM information reporting stores the dedicated preamble after receiving the dedicated preamble.

S302: A UE1 detects the EM information, selects the dedicated preamble, and sends, by using relatively high power, EM information to the eNB1, where the UE1 is in idle state.

S303: After detecting the information reported by the UE1, the eNB1 feeds back a TA (timing advance) message and an SG (scheduling grant) message to the UE1.

S304: After receiving the TA and the SG, the UE1 feeds back an RRC Connection Request message to the eNB1.

S305: After receiving the RRC Connection Request message, the eNB1 feeds back an RRC Connection Setup message to the UE1.

S306: After receiving the RRC Connection Setup message, the UE1 feeds back an RRC Connection Setup Complete message to the eNB1, where the RRC Connection Setup Complete message includes NAS signaling that carries the EM information.

S307: After receiving the NAS signaling that carries the EM information, the eNB1 forwards the NAS signaling to an MME.

S308: After the MME receives the NAS signaling, when detecting that the NAS signaling includes the EM information, the MME executes a process of authenticating the UE1 and calculates, according to the EM information, an eNB to which a UE to be notified of the EM belongs, and sends an EM notification message to the eNB to which the UE to be notified of the EM belongs, where the message carries the EM information.

S309: The eNB that receives the EM notification message feeds back an EM notification response message to the MME.

S310: If the EM notification message received by the eNB includes accident point information of the EM, the eNB generates an EM broadcast message by using the accident point information of the EM, and then notifies the UE of the EM event by using a paging message that carries the EM information; or if the EM notification message obtained by the eNB includes only the EM information, the eNB directly notifies the UE of the EM information by using a paging message that carries the EM information.

S311: After receiving the paging message that carries the EM information, a UE in a cell to which each eNB belongs reports the EM information to an application layer, so as to complete handling the alarm event.

In addition, based on the content of the second embodiment, if the UE on which the EM occurs is in connected state, an access process is not required. That is, the method may not include a part of the access process from S303 to S306, but it is only required that the UE1 should directly send the NAS signaling that carries the EM information to the eNB1, or the UE1 should directly send the EM information to the eNB1. A handling process after the eNB1 receives the EM information is the same and is not further described herein.

Certainly, a process in which the UE1 establishes a connection with the eNB1 may be implemented by using an existing access operation instead of using the dedicated preamble; in addition, after the MME receives the NAS signaling, if it is determined that the UE1 has executed an operation of authenticating an EM information reporting capability, the authentication operation can be omitted and a subsequent operation is directly performed.

Figure 3:
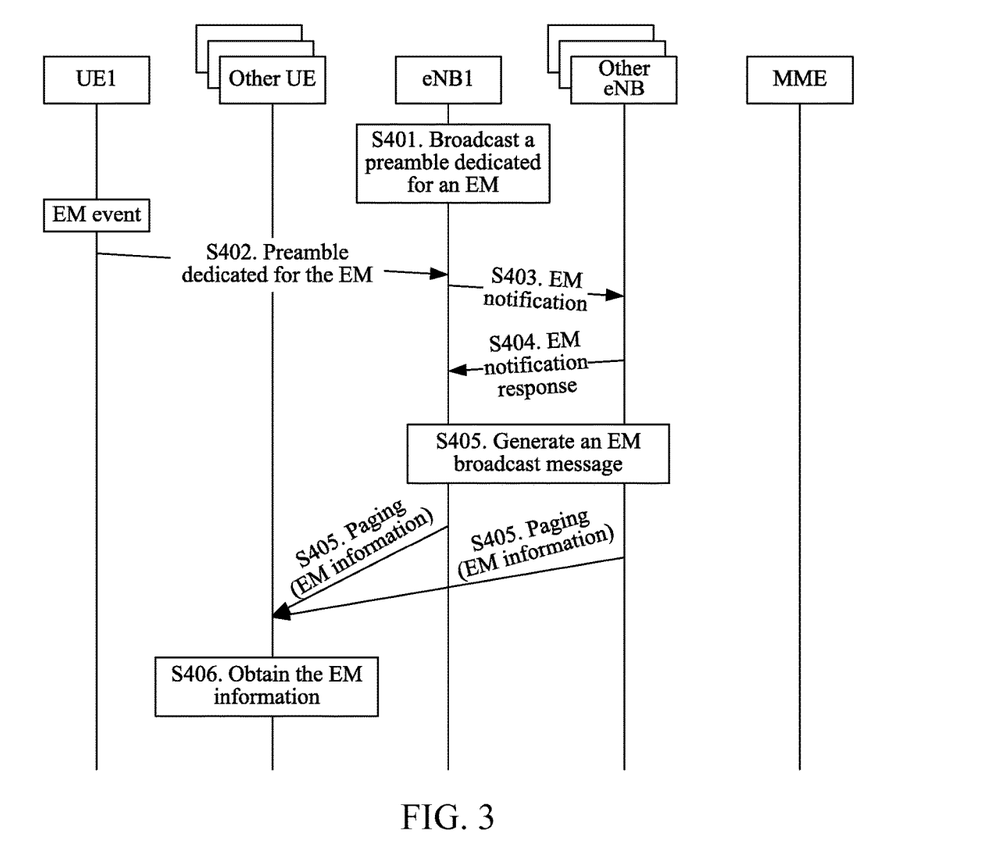
FIG. 3 is a schematic flowchart of another method for implementing alarm event handling according to an embodiment of the present invention, where an eNB is used as a forwarding point.

A third embodiment of the present invention is described by using an example that an eNB serves as a forwarding point. As shown in FIG. 3, the method includes the following steps:

S401: A dedicated preamble used for an EM is configured for an eNB1, and the eNB1 notifies UEs in a cell of the dedicated preamble by using cell broadcast, so that a UE capable of EM reporting stores the dedicated preamble after receiving the dedicated preamble.

S402: A UE1 detects occurrence of the EM, selects the dedicated preamble, and sends, by using relatively high power, EM information to the eNB1, where the UE1 is in connected state.

S403: After detecting the information reported by the UE1, the eNB1 determines, based on location information of the UE1 whether another eNB needs to be notified of the EM information, and if yes, sends an EM notification message to the another eNB.

S404: After receiving the EM notification message, the another eNB feeds back a response message to the eNB1.

S405: If the EM notification message received by the another eNB includes accident point information of the EM, an EM broadcast message is generated by using the accident point information of the EM, and then a UE is notified of the EM information by using a paging message that carries the EM information; or if the EM notification message obtained by the another eNB includes only the EM information, the UE is directly notified of the EM information by using a paging message that carries the EM information.

S406: After receiving the paging message that carries the EM information, a UE in a cell to which each eNB belongs reports the EM information to an application layer, so as to complete handling the alarm event.

Figure 4:
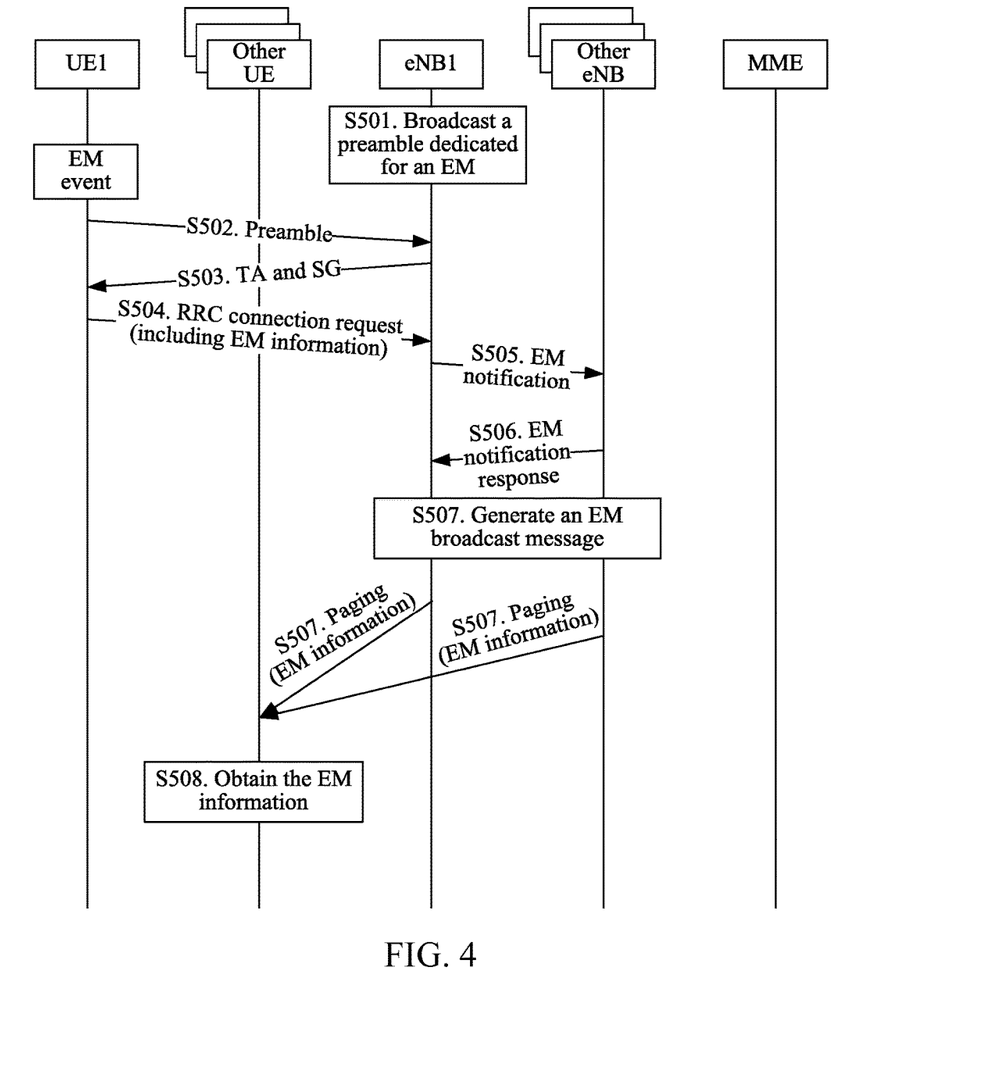
FIG. 4 is a schematic flowchart of another method for implementing alarm event handling according to an embodiment of the present invention.

In addition, based on the content of the third embodiment, in a solution provided in a fourth embodiment, the EM information may be carried to the eNB1 in an access process of the UE1. As shown in FIG. 4, the method includes the following steps:

S501: A dedicated preamble used for an EM is configured for the eNB1, and the eNB1 notifies UEs in a cell of the dedicated preamble by using cell broadcast, so that a UE capable of EM reporting stores the dedicated preamble after receiving the dedicated preamble.

S502: After detecting occurrence of the EM, the UE1 selects the dedicated preamble, and sends, by using relatively high power, EM information to the eNB1, where the UE1 is in idle state.

S503: After detecting the information reported by the UE1, the eNB1 feeds back a TA (timing advance) message and an SG (scheduling grant) message to the UE1.

S504: After receiving the TA and the SG, the UE1 feeds back an RRC Connection Request message that carries the EM information to the eNB1.

S505: After detecting the information reported by the UE1, the eNB1 determines, based on location information of the UE1, whether another eNB needs to be notified of the EM information, and if yes, sends an EM notification message to the another eNB.

S506: After receiving the EM notification message, the another eNB feeds back a response message to the eNB1.

S507: If the EM notification message received by the another eNB includes accident point information of the EM, an EM broadcast message is generated by using the accident point information of the EM, and then a UE is notified of the EM information by using a paging message that carries the EM information; or if the EM notification message obtained by the eNB includes only the EM information, the UE is directly notified of the EM information by using a paging message that carries the EM information.

S508: After receiving the paging message that carries the EM information, a UE in a cell to which each eNB belongs reports the EM information to an application layer, so as to finish handling the alarm event.

In addition, based on the content of the third embodiment and the fourth embodiment, if the UE on which the EM occurs is in connected state, an access process is not required. That is, the UE1 directly sends the NAS signaling that carries the EM information to the eNB1, or the UE1 directly sends the EM information to the eNB1. A handling process after the eNB1 receives the EM information is the same and is not further described herein. Furthermore, based on an actual application requirement, after the eNB1 receives the EM information, if the UE1 does not execute a process of authenticating an EM reporting capability of the UE, the eNB1 may initiate an operation of authenticating the UE1 to the MME, or the eNB1 completes an operation of authenticating the UE1. A specific authentication process may be implemented by using an existing authentication manner, and no further details are provided herein in this embodiment.

Figure 5:
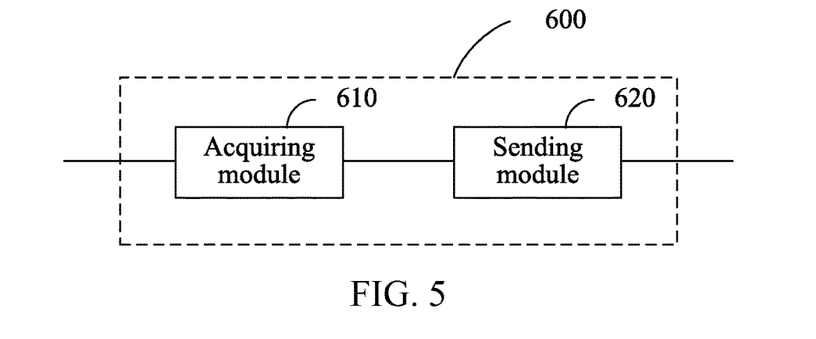
FIG. 5 is a schematic diagram of a structure of an apparatus for handling an alarm event according to an embodiment of the present invention.

Based on the forgoing idea, a fifth embodiment of the present invention further provides an apparatus for implementing alarm event handling. As shown in FIG. 5, the apparatus 600 includes: an acquiring module 610, configured to acquire alarm event EM information reported by a user equipment UE; and a sending module 620, configured to send an EM notification to at least one eNB that needs to be notified of the EM information, where the EM notification includes the EM information acquired by the acquiring module 601. The sending module 620 is configured to send the EM notification that includes the EM information to a UE of a first eNB.

Specifically, the acquiring module 610 includes (not indicated in the figure): a first acquiring submodule, configured to, when the UE on which the EM occurs is in connected state, directly acquire the EM information reported by the UE; and a second acquiring submodule, configured to, when the UE on which the EM occurs is in idle state, acquire the EM information after a radio resource control RRC connection is established with the UE.

The second acquiring submodule is specifically configured to: when the UE on which the EM occurs is in idle state, acquire the EM information from an RRC Connection Setup Complete message; or when the UE on which the EM occurs is in idle state, acquire the EM information from non-access stratum signaling in an RRC Connection Setup Complete message; or, when the UE on which the EM occurs is in idle state, acquire the EM information from a service request message in an RRC Connection Setup Complete message; or when the UE on which the EM occurs is in idle state, acquire the EM information from an attach request message in an RRC Connection Setup Complete message.

Preferably, the first acquiring submodule is specifically configured to: acquire the EM information from non-access stratum signaling, a service request message, or an attach message that is sent by the UE and carries the EM information.

In addition, the apparatus 600 may further include (not indicated in the figure): a setting module, configured to preset a dedicated preamble used for the EM; and the acquiring module is specifically configured to acquire, by using the dedicated preamble that is preset by the setting module, the EM information reported by the UE.

In addition, the apparatus 600 further includes (not indicated in the figure): a determining module, configured to determine whether to notify the at least one eNB of the EM information acquired by the acquiring module; and the sending module is specifically configured to send the EM notification to the at least one eNB according to a determining result of the determining module.

The determining module is specifically configured to: determine, according to location information of the UE, whether to send the EM notification to the at least one eNB; or pre-configure a neighboring cell forwarding table of the first eNB, where the forwarding table contains information about the at least one eNB that needs to be notified of the EM information, and when detecting the at least one eNB in the neighboring cell forwarding table, send the EM notification to the at least one eNB.

It should be noted that the sending module is further configured to: notify a mobility management entity MME of the EM information after the acquiring module acquires the EM information, so that after receiving the EM notification that includes the EM information, the MME sends the EM notification that includes the EM information to the at least one eNB that needs to be notified of the EM information.

In addition, the apparatus 600 may further include (not indicated in the figure): a receiving module, configured to receive authentication information delivered by the MME; and a processing module, configured to execute, according to the authentication information received by the receiving module, an operation of authentication capability of the UE to report the EM notification acquired by the acquiring module The sending module may specifically be further configured to: if the EM information is long EM information, generate and send an EM broadcast message that includes the long EM information, where the long EM information includes the location information of the UE and/or moving direction information of the UE and/or specific content information of an EM information; and the first eNB sends a paging message that carries an indication of the EM broadcast message to the UE of the first eNB; or if the EM information is short EM information that includes indication information of an EM event, directly send a paging message that carries an EM information indication to the UE of the first eNB; or send a paging message that includes a scheduling information indication, where the scheduling information indication is used to indicate that the UE of the first eNB is notified of the EM information by using a physical downlink shared channel; or send, by scheduling a radio network temporary identifier dedicated for the EM or using a physical downlink control channel of a dedicated radio network temporary identifier to carry the EM information, the EM notification that includes the EM information to the UE of the first eNB.

Figure 6:
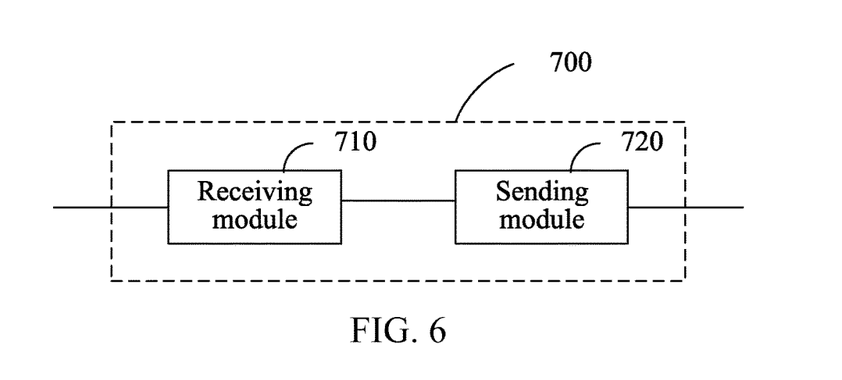
FIG. 6 is a schematic diagram of another structure of an apparatus for handling an alarm event according to an embodiment of the present invention.

In addition, a sixth embodiment of the present invention further provides an apparatus for handling an alarm event. As shown in FIG. 6, the apparatus 700 includes: a receiving module 710, configured to receive an EM notification that includes alarm event EM information, where the EM information is acquired by a first eNB from EM information reported by a user equipment UE; and a sending module 720, configured to send the EM notification to a UE that belongs to at least one eNB, where the EM notification is received by the receiving module and includes an EM information.

The sending module 720 is further configured to forward the EM notification that includes the EM event to an eNB that is adjacent to the at least one eNB. The receiving module 710 may be further specifically configured to: receive the EM notification that is sent by the first eNB according to location information of the UE; or receive the EM notification that is sent by the first eNB after detecting the at least one eNB in a pre-configured neighboring cell forwarding table, where the forwarding table includes information about the at least one eNB that needs to be notified of the EM information.

In addition, the receiving module 710 may be further specifically configured to: receive the EM notification that includes the EM information and is forwarded by the first eNB through an MME.

Figure 7:
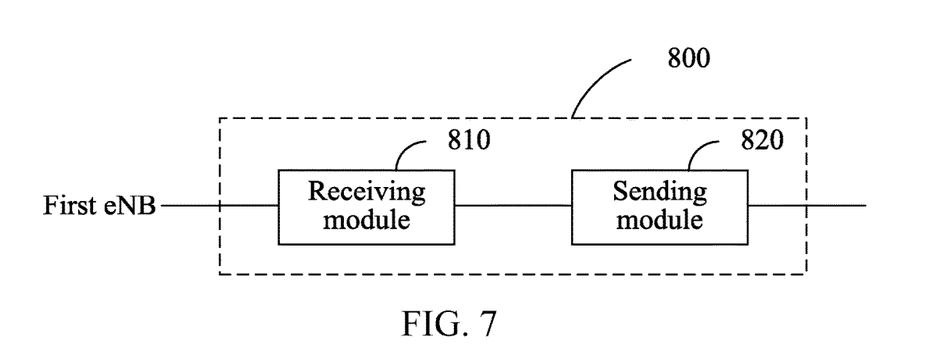
FIG. 7 is a schematic diagram of still another structure of an apparatus for handling an alarm event according to an embodiment of the present invention.

Based on the foregoing same idea, a seventh embodiment of the present invention further provides an apparatus for handling an alarm event. As shown in FIG. 7, the apparatus 800 includes: a receiving module 810, configured to receive an EM notification that includes EM information and is sent by a first NodeB eNB; and a sending module 820, configured to, after the receiving module 810 receives the EM notification that includes the EM information, send the EM notification that includes the EM information to at least one eNB.

The sending module 820 may be further specifically configured to: learn, according to the EM information, the at least one eNB that needs to be notified of the EM information, and send the EM notification to the at least one eNB; or pre-configure an EM forwarding table, where the forwarding table records information about the at least one eNB that needs to be notified of the EM information; and then deliver, by using the forwarding table, an EM notification message to the at least one eNB that needs to be notified of the EM information.

In addition, the sending module 820 is further configured to execute, according to the EM information after the EM information is acquired, an operation of authenticating an EM notification reporting capability of a UE.

It should be noted that, a person skilled in the art easily understands that the methods and the apparatuses for handling an alarm event described in the foregoing embodiments may also exist as a part of other systems, and a method for implementing alarm event handling in a system is consistent with the description in the foregoing embodiments. Therefore, other systems that include the apparatus for handling an alarm event according to the foregoing embodiments should also be included in the protection scope of the present invention, and no further details are provided herein.

A person skilled in the art may be further aware that, in combination with the examples described in the embodiments disclosed in this specification, units and steps of the method may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of the methods or algorithms described with reference to the embodiments disclosed in this specification may be implemented directly by hardware, a software module executed by a processor, or a combination thereof.

The foregoing description disclosed in the embodiments allows a person skilled in the art to implement or use the embodiments of the present invention. Multiple modifications to these embodiments are apparent for a person skilled in the art. The general principle defined in this specification may be implemented in other embodiments without departing from the spirit or scope of the embodiments of the present invention. Therefore, the embodiments of the present invention will not be limited to the embodiments described in this specification but extends to a widest scope that complies with the principle and novelty disclosed in this specification.

The foregoing descriptions are merely exemplary embodiments among embodiments of the present invention, but are not intended to limit the embodiments of the present invention. Any modification, equivalent replacement, or improvement made within the spirit and principle of the embodiments of the present invention should fall within the protection scope of the embodiments of the present invention.

What is claimed is:

1. A method for handling alarm events, the method comprising:
    acquiring, by a first evolved NodeB (eNB), alarm event information reported by a first user equipment (UE), wherein the alarm event information is one of either a long emergency message (EM) information or a short EM information;
    determining, by the first eNB after acquiring the alarm event information, a geographical location of a second UE that is to receive the alarm event information;
    selecting, by the first eNB, a second eNB serving the second UE based on the geographical location of the second UE, wherein the second eNB is determined to be notified of the alarm event information for sending the alarm event information to the second UE;
    sending, by the first eNB, an alarm notification that comprises the alarm event information to the second eNB, causing the second eNB to send the alarm event information to the second UE served by the second eNB;
    in response to determining that the alarm event information is the long EM information, sending, by the first eNB, a broadcast message that comprises the long EM information, and directly sending a first paging message comprising an indication of the broadcast message to a third UE of the first eNB; and
    in response to determining that the alarm event information is the short EM information, directly sending, by the first eNB to the third UE, a second paging message comprising the short EM information.

2. The method according to claim 1, wherein acquiring the alarm event information reported by the first UE comprises:
    when the first UE is in a connected state, directly acquiring the alarm event information reported by the first UE; and when the first UE is in an idle state, acquiring the alarm event information after the first eNB establishes a radio resource control (RRC) connection with the first UE, the alarm event information being carried in a RRC Connection Setup Complete message.

3. The method according to claim 2, wherein, when the first UE is in the idle state, acquiring the alarm event information after the first eNB establishes the RRC connection with the first UE comprises:
acquiring the alarm event information from non-access stratum signaling in the RRC Connection Setup Complete message; or
acquiring the alarm event information from a service request message in the RRC Connection Setup Complete message; or
acquiring the alarm event information from an attach message in the RRC Connection Setup Complete message.

4. The method according to claim 2, wherein, when the first UE is in the connected state, directly acquiring the alarm event information reported by the first UE comprises:
acquiring non-access stratum signaling, a service request message, or an attachment message, wherein the non-access stratum signaling, the service request message, or the attachment message is sent by the first UE and carries the alarm event information.

5. The method according to claim 1, further comprising:
presetting a dedicated preamble used for reporting alarm events by UEs to the first eNB; and
acquiring, by the first eNB, the alarm event information reported by the first UE using the dedicated preamble.

6. The method according to claim 1, wherein sending the alarm notification that comprises the alarm event information to the second eNB that needs to be notified of the alarm event information comprises:
determining, by the first eNB, whether to notify the second eNB of the alarm event information, and when determining to notify the second eNB of the alarm event information, sending the alarm notification to the second eNB.

7. The method according to claim 1, further comprising:
sending, by the first eNB, the alarm notification comprising the alarm event information to a third eNB, wherein the third eNB is determined based on a pre-configured forwarding table of the first eNB, and wherein the pre-configured forwarding table comprises information of one or more eNBs that need to be notified of the alarm event information.

8. The method according to claim 1, further comprising notifying a mobility management entity (MME) of the alarm event information after the first eNB acquires the alarm event information, causing, after receiving the alarm notification that comprises the alarm event information, the MME to send the alarm notification that comprises the alarm event information to the second eNB that needs to be notified of the alarm event information.

9. The method according to claim 8, further comprising:
receiving, by the first eNB, authentication information delivered by the MME; and
performing, by the first eNB, according to the authentication information, authentication of a capability of the first UE for reporting alarm event information.

10. The method according to claim 1, further comprising:
sending, by the first eNB, a paging message that comprises a scheduling information, wherein the scheduling information indicates that the third UE of the first eNB is notified of the alarm event information using a physical downlink shared channel; or
sending, by scheduling a radio network temporary identifier dedicated for the alarm event information or using a physical downlink control channel of a dedicated radio network temporary identifier to carry the alarm event information, the alarm notification that comprises the alarm event information to the third UE of the first eNB.

11. A method for handling alarm events, the method comprising:
receiving, by a second evolved NodeB (eNB), an alarm notification that comprises alarm event information, wherein the alarm event information is acquired by a first eNB from a first user equipment (UE) that reports the alarm event information, wherein the alarm notification is destined for a second UE that belongs to the second eNB, and wherein the alarm event information is one of either a long emergency message (EM) information or a short EM information; and
sending, by the second eNB, the alarm notification to the second UE, wherein sending the alarm notification to the second UE comprises determining whether to send a paging message or a broadcast message to carry the alarm event information based on content of the alarm event information, and wherein, in response to determining that the alarm event information is the long EM information, sending the alarm notification to the second UE comprises generating and sending an alarm broadcast message that comprises the long EM information, and directly sending a first paging message that carries an indication of the alarm broadcast message to the second UE, and wherein, in response to determining that the alarm event information is the short EM information, sending the alarm notification of the second UE comprises directly sending a second paging message comprising the short EM information; and
wherein the second eNB is selected by the first eNB for receiving the alarm notification based on a geographical location of the second UE.

12. The method according to claim 11, further comprising forwarding, by the second eNB, the alarm notification that comprises the alarm event information to a third eNB.

13. The method according to claim 11, wherein receiving the alarm notification that comprises the alarm event information comprises:
receiving, by the second eNB, the alarm notification from the first eNB, wherein the first eNB determines to send the alarm notification to the second eNB according to location information of the second UE.

14. The method according to claim 11, wherein receiving the alarm notification that comprises the alarm event information comprises receiving, by the second eNB, the alarm notification that is forwarded by the first eNB through a mobility management entity (MME).

15. An apparatus for handling alarm events, the apparatus comprising:
a processor, configured to:
acquire alarm event information reported by a first user equipment (UE) of a first eNB, wherein the alarm event information is one of either a long emergency message (EM) information or a short EM information;
determine, after acquiring the alarm event information, a geographical location of a second UE that is to receive the alarm event information; and select a second eNB serving the second UE based on the geographical location of the second UE, for sending the alarm event information to the second eNB causing the second eNB to send the alarm event information to the second UE served by the second eNB; and a transmitter, configured to:
send an alarm notification to the second eNB, wherein the alarm notification comprises the alarm event information acquired by the processor; and
send the alarm notification that comprises the alarm event information to a third UE of the first eNB, wherein sending the alarm notification to the third UE of the first eNB comprises:
determining whether to send a paging message or a broadcast message to carry the alarm event information based on content of the alarm event information;
in response to determining that the alarm event information is the long EM information, sending an alarm broadcast message that comprises the long EM information and directly sending a first paging message that carries an indication of the alarm broadcast message to the third UE; and
in response to determining that the alarm event information is the short EM information, directly sending a second paging message that carries the short EM information to the third UE of the first eNB.

16. The apparatus according to claim 15, wherein the processor is configured to:
when the first UE is in a connected state, directly acquire the alarm event information reported by the first UE; and
when the first UE is in an idle state, acquire the alarm event information after a radio resource control RRC connection is established with the first UE.

17. The apparatus according to claim 16, wherein, when the first UE is in the idle state, the processor is configured to:
acquire the alarm event information from an RRC Connection Setup Complete message; or
acquire the alarm event information from non-access stratum signaling in the RRC Connection Setup Complete message; or
acquire the alarm event information from a service request message in the RRC Connection Setup Complete message; or
acquire the alarm event information from an attach message in the RRC Connection Setup Complete message.

18. The apparatus according to claim 16, wherein the processor is configured to acquire the alarm event information from non-access stratum signaling, a service request message, or an attach message, wherein the non-access stratum signaling, the service request message, or the attach message is sent by the first UE and carries the alarm event information.

19. The apparatus according to claim 15, wherein the processor is further configured to:
preset a dedicated preamble used for reporting alarm events to the first eNB; and
acquire, using the dedicated preamble that is set, the alarm event information reported by the first UE.

20. The apparatus according to claim 15, wherein the processor is further configured to:
determine whether to notify the second eNB of the alarm event information acquired; and
send the alarm notification to the second eNB according to a determining result.

21. The apparatus according to claim 15, wherein the processor is configured to:
send the alarm notification to a third eNB, wherein the third eNB is determined for receiving the alarm notification based on a pre-configured forwarding table, and wherein the pre-configured forwarding table comprises information of one or more eNBs that need to be notified of the alarm event information.

22. The apparatus according to claim 15, wherein the transmitter is further configured to send the alarm notification to a mobility management entity (MME) after the alarm event information is acquired, causing, after receiving the alarm notification that comprises the alarm event information, the MME to send the alarm notification that comprises the alarm event information to the second eNB that needs to be notified of the alarm event information.

23. The apparatus according to claim 22, further comprising:
a receiver, configured to receive authentication information delivered by the MME; and
the processor is further configured to execute, according to the authentication information received by the receiver, an operation of authenticating a capability of the first UE for reporting alarm event information.

24. The apparatus according to claim 15, wherein the transmitter is further configured to:
sending, by scheduling a radio network temporary identifier dedicated for the alarm event information or using a physical downlink control channel of a dedicated radio network temporary identifier to carry the alarm event information, the alarm notification that comprises the alarm event information to the third UE of the first eNB.

25. A second evolved NodeB (eNB) for handling alarm events, the second eNB comprising:
a receiver, configured to receive an alarm notification that comprises alarm event information, wherein the alarm event information is acquired by a first eNB from a first user equipment (UE) that reports the alarm event information, wherein the alarm notification is to be forwarded to a second UE that belongs to the second eNB, and wherein the alarm event information is one of either a long emergency message (EM) information or a short EM information; and
a transmitter, configured to send the alarm notification to the second UE, wherein sending the alarm notification to the second UE comprises determining whether to send a paging message or a broadcast message to carry the alarm event information based on content of the alarm event information, and wherein, in response to determining that the alarm event information is the long EM information, the transmitter is configured to send the alarm notification to the second UE by generating and sending an alarm broadcast message that comprises the long EM information, and by directly sending a first paging message that carries an indication of the alarm broadcast message to the second UE, and wherein, in response to determining that the alarm event information is the short EM information, the transmitter is configured to send the alarm notification to the second UE by directly sending a second paging message that carries the short EM information to the second UE; and
wherein the second eNB is selected for receiving the alarm notification based on a location of the second UE.

26. The second eNB according to claim 25, wherein the transmitter is further configured to forward the alarm notification that comprises the alarm event information to a third eNB.

27. The second eNB according to claim 25, wherein the receiver is configured to:
   receive the alarm notification from the first eNB, wherein the first eNB determines to send the alarm notification to the second eNB according to location information of the second UE.

28. The second eNB according to claim 25, wherein the receiver is configured to receive the alarm notification that is forwarded by the first eNB through an MME.

\* \* \* \* \*